(12) United States Patent
Nishida et al.

(10) Patent No.: US 11,800,035 B2
(45) Date of Patent: Oct. 24, 2023

(54) READING APPARATUS FOR READING REFLECTED LIGHT

(71) Applicant: FUJIFILM Business Innovation Corp., Tokyo (JP)

(72) Inventors: Yoji Nishida, Kanagawa (JP); Masato Serikawa, Kanagawa (JP); Emiko Shiraishi, Kanagawa (JP); Daisuke Nakai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/718,259

(22) Filed: Apr. 11, 2022

(65) Prior Publication Data

US 2023/0179727 A1 Jun. 8, 2023

(30) Foreign Application Priority Data

Dec. 8, 2021 (JP) .................................. 2021-198936

(51) Int. Cl.
*H04N 1/028* (2006.01)
*H04N 1/00* (2006.01)

(52) U.S. Cl.
CPC ....... *H04N 1/0289* (2013.01); *H04N 1/00801* (2013.01)

(58) Field of Classification Search
None
See application file for complete search history.

(56) References Cited

U.S. PATENT DOCUMENTS

| 6,560,351 B1 * | 5/2003 | Hirota | H04N 1/0035 356/369 |
| 2015/0002913 A1 * | 1/2015 | Takahashi | H04N 1/125 358/475 |

FOREIGN PATENT DOCUMENTS

| JP | 2010130444 | 6/2010 |
| JP | 2021060375 | 4/2021 |

* cited by examiner

*Primary Examiner* — Andrew H Lam
(74) *Attorney, Agent, or Firm* — JCIPRNET

(57) ABSTRACT

A reading apparatus that reads an image formed on a document while transporting the document, the reading apparatus includes a first reading section that reads, as a read image, one of specularly reflected light or diffusely reflected light which is reflected from the document on a reading glass through which the moving document passes, and a second reading section that reads, as a read image, the other of the specularly reflected light or the diffusely reflected light which is reflected from the document on one side of a transport path through which the document is transported.

6 Claims, 6 Drawing Sheets

READING APPARATUS FOR READING REFLECTED LIGHT

CROSS-REFERENCE TO RELATED APPLICATIONS

This application is based on and claims priority under 35 USC 119 from Japanese Patent Application No. 2021-198936 filed Dec. 8, 2021.

BACKGROUND

(i) Technical Field

The present invention relates to a reading apparatus.

(ii) Related Art

There is known a reading apparatus including a transparent plate-shaped member that supports a document, a first irradiation section that performs irradiation with light from a plate-shaped member side in order to read diffusely reflected light from the document supported by the plate-shaped member, a light guiding section that guides the diffusely reflected light, which is light emitted by the first irradiation section, to a determined position, a generation section that generates a signal according to light received at the determined position, and a second irradiation section that performs irradiation with light from the plate-shaped member side in order to read a part of a specularly reflected light component from the document supported by the plate-shaped member and performs irradiation with light such that a part of the specularly reflected light component is guided by the light guiding section and a signal is generated by the generation section at the determined position, in which an angle of incidence of light emitted by the second irradiation section to the document is an inclination that is not 0 degree with respect to a reflection angle of main rays of the specularly reflected light guided by the light guiding section (JP2010-130444A).

There is also known a light sensor device including a light source, an optical system that includes a collimating lens and irradiates a front surface of a recording medium at an irradiation region with light from the light source at a predetermined incident angle, a first light receiving unit that detects the amount of specularly reflected light specularly reflected from the front surface of the recording medium in the irradiation region, and at least one second light receiving unit that detects the amount of diffusely reflected light diffusely reflected from the front surface of the recording medium in the irradiation region at at least one reflection angle, in which the light source is a surface-emitting LED (JP2021-60375A).

SUMMARY

Aspects of non-limiting embodiments of the present disclosure relate to a reading apparatus that obtains specularly reflected light and diffusely reflected light from a document as a read image with a single reading operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading apparatus that reads an image formed on a document while transporting the document, the reading apparatus including a first reading section that reads, as a read image, one of specularly reflected light or diffusely reflected light which is reflected from the document on a reading glass through which the moving document passes, and a second reading section that reads, as a read image, the other of the specularly reflected light or the diffusely reflected light which is reflected from the document on one side of a transport path through which the document is transported.

BRIEF DESCRIPTION OF THE DRAWINGS

Exemplary embodiment(s) of the present invention will be described in detail based on the following figures, wherein.

DETAILED DESCRIPTION

Next, the present invention will be described in more detail with reference to the drawings by giving exemplary embodiments and specific examples below, but the present invention is not limited to the exemplary embodiments and the specific examples.

In addition, in the description using the drawings below, it is to be noted that the drawings are schematic, the ratio of each dimension is different from the actual ratio, and members that are not necessary for the description to facilitate understanding will not be shown as appropriate.

(1) Overall Configuration and Operation of Image Forming Apparatus

Figure 1:
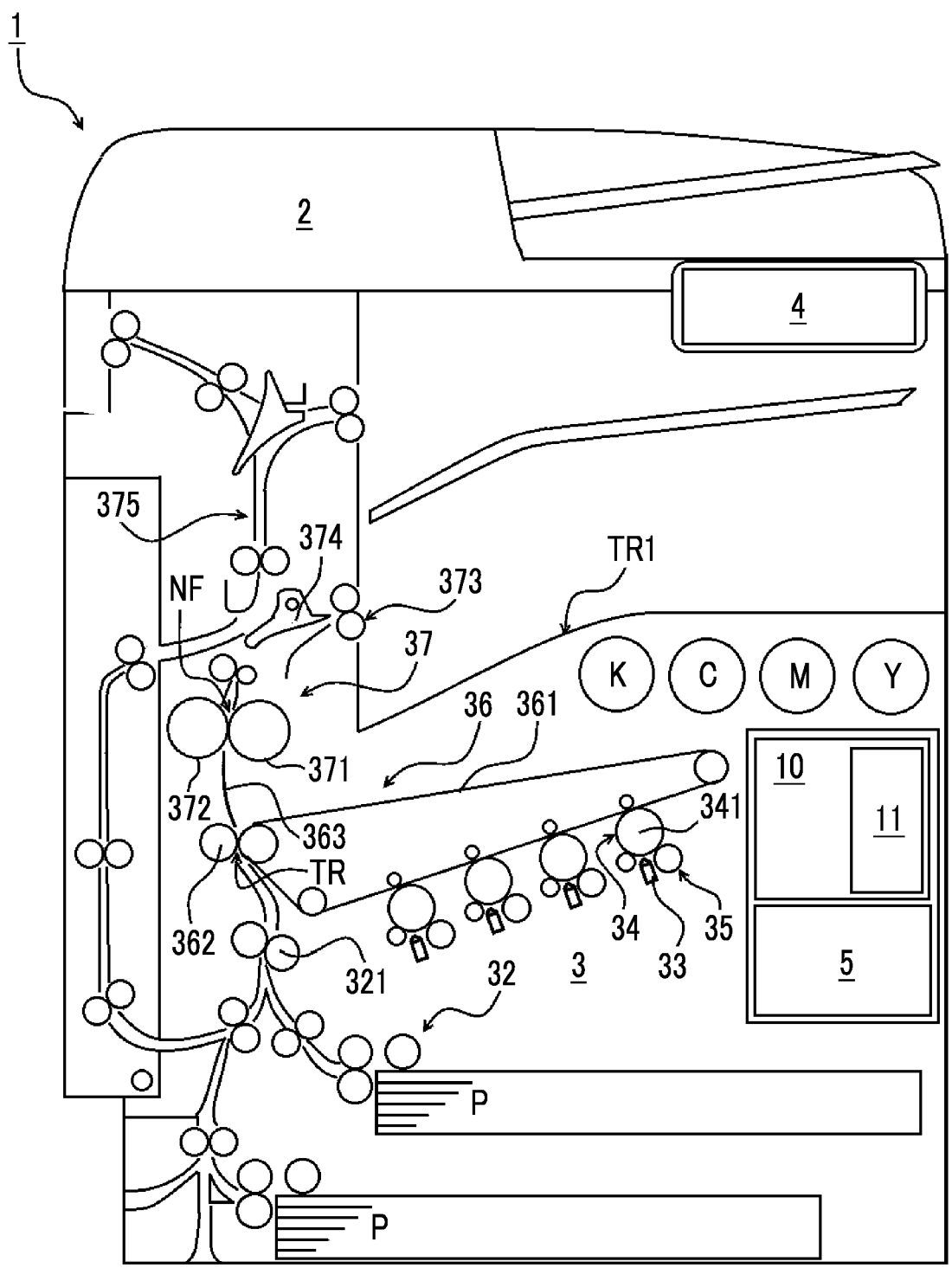
FIG. 1 is a schematic cross-sectional view showing an internal configuration of an image forming apparatus including a reading apparatus.

FIG. 1 is a schematic cross-sectional view showing an internal configuration of an image forming apparatus 1 including a reading apparatus 2 according to the present exemplary embodiment. Hereinafter, the overall configuration and operations of the image forming apparatus 1 will be described with reference to the drawings.

(1.1) Overall Configuration

The image forming apparatus 1 is configured to include the reading apparatus 2 that reads an image from a sheet S such as a document and converts the image into image data, an image forming unit 3 that is image recording means which prints the read image data on paper, which is a recording medium, an operation information unit 4 that is a user interface, and an image processing unit 5.

Figure 2:
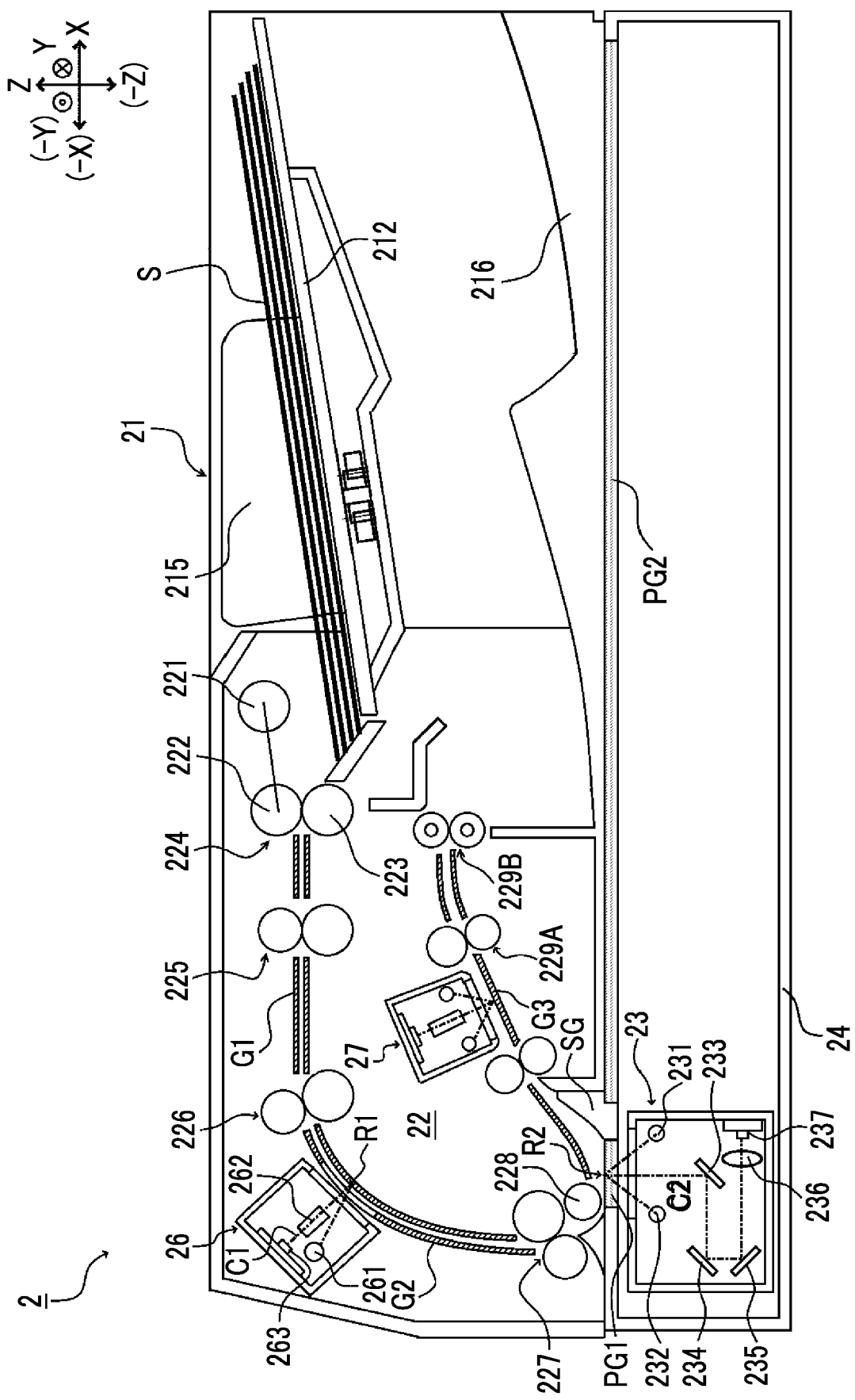
FIG. 2 is a cross-sectional configuration view showing an internal configuration of a reading apparatus according to a first exemplary embodiment.

The reading apparatus 2 is configured to include a sheet stacked portion 21, an automatic sheet sending unit 22, a first reading unit 23, a second reading unit 26, and a third reading unit 27 (see FIG. 2). Both sides of the sheet S placed on the sheet stacked portion 21 are read by the second reading unit 26, the first reading unit 23, and the third reading unit 27 that are arranged in the middle of a transport path while the sheet S is being transported by the automatic sheet sending unit 22. The image read by the second reading unit 26, the first reading unit 23, and the third reading unit 27 is converted into image data, which is an electrical signal.

In addition, an image on the sheet S placed on platen glass PG2 (see PG2 in FIG. 2), that is, the entire sheet S is read while the first reading unit 23 is sequentially moved in a sub-scanning direction X.

The image forming unit 3 is configured to include a paper feeding device 32, an exposure device 33, a photoconductor unit 34, a developing device 35, a transfer device 36, and a fixing device 37 and forms image information received from the image processing unit 5 on paper P sent from the paper feeding device 32 as a toner image.

The operation information unit 4, which is a user interface, is arranged on the front side of the reading apparatus 2. The operation information unit 4 is configured by combining a liquid crystal display panel, various types of operation buttons, and a touch panel, and a user of the image forming apparatus 1 performs various types of inputs of setting and instruction via the operation information unit 4. In addition, various types of information are displayed for the user of the image forming apparatus 1 via the liquid crystal display panel.

The image processing unit 5 generates image data from an image read by the reading apparatus 2 and printing information transmitted from an external device (for example, a personal computer).

(1.2) Image Forming Unit

In the image forming unit 3, paper P designated for each sheet of printing in a print job from the paper feeding device 32 is sent to the image forming unit 3 at an image forming timing.

The photoconductor unit 34 includes photoconductor drums 341 that are each provided above the paper feeding device 32 in parallel and are rotationally driven. Yellow (Y), magenta (M), cyan (C), and black (K) toner images are formed on the photoconductor drums 341 respectively, on which electrostatic latent images are formed by the exposure devices 33, by the respective developing devices 35.

Each color toner image formed on the photoconductor drum 341 of each photoconductor unit 34 is sequentially electrostatically transferred (primarily transferred) on an intermediate transfer belt 361 of the transfer device 36, and a superimposed toner image on which each color toner is superimposed is formed. The superimposed toner image on the intermediate transfer belt 361 is sent out from a pair of resist rollers 321 and is collectively transferred on the paper P guided by a transport guide by a secondary transfer roller 362.

In the fixing device 37, a fixing nip FN (fixing region) is formed by a pressure contact region between a pair of a heating module 371 and a pressurizing module 372.

The paper P on which the toner image is collectively transferred by the transfer device 36 is transported to the fixing nip FN of the fixing device 37 via a transport guide 363 in a state where the toner image is not fixed, and the toner image is fixed by the pair of the heating module 371 and the pressurizing module 372 by action of heating and crimping.

The paper P on which the fixed toner image is formed is guided by a switching gate 374 and is discharged and accommodated in a discharged paper tray portion TR1 on an upper surface of the image forming apparatus 1 from a pair of first discharge rollers 373. In addition, in a case where the paper P is inverted for two-sided printing or is discharged with an image recording surface facing upward, a transport direction is switched to a transport path 375 at the switching gate 374.

(2) Reading Apparatus

FIG. 2 is a cross-sectional configuration view showing an internal configuration of the reading apparatus 2. Hereinafter, a configuration and a reading operation of the reading apparatus 2 will be described with reference to the drawings.

The sheet stacked portion 21 includes a sheet tray 212 on which the sheet S, which is an example of a document and on which an image is recorded, is placed.

The automatic sheet sending unit 22 includes a nudger roller 221 that takes out the sheet S placed on the sheet tray 212 from the top in turn and a separating unit 224 that consists of a feed roller 222 and a retard roller 223.

In a case where the feed roller 222 and the retard roller 223 are paired and the sheets S overlapping each other are sent out to a nip portion N, the separating unit 224 separates (handles) the sheets S and transports one by one to a sheet transport path G1.

In the sheet transport path G1, a takeaway roller 225 is arranged at a position on a downstream side of the feed roller 222 with respect to the transport direction of the sheet S. The takeaway roller 225 transports the sheet S sent out by the feed roller 222 to a pre-registration roller 226.

On the downstream side of the pre-registration roller 226, a sheet transport path G2 which is curved such that the inner side is recessed and through which the sheet S is transported to the registration roller 227 is formed.

On an outer side of the sheet transport path G2, the second reading unit 26 that reads a front surface of the transported sheet S is arranged. The second reading unit 26 is an example of a second reading section in the present invention.

As shown in FIG. 2, the second reading unit 26 is configured by a light source 261 that consists of a light emitting diode (LED), an image forming lens 262 that forms an image of reflected light from the sheet S at a predetermined magnification, and an image sensor (solid-state imaging element using CMOS) 263. The light source 261 irradiates an irradiation region R1 of the sheet S with light at an acute angle with respect to an optical path C1 of the reflected light, for example, 8 degrees or less, and a specularly reflected image is obtained based on specularly reflected light.

The pre-registration roller 226 forms a loop in a state where a tip of the sheet S is abutted against the stopped registration roller 227 and corrects a skew. The registration roller 227 is rotationally driven at a reading start timing, the sheet S is pressed against a reading glass PG1 by a platen roller 228 in a state where the loop is held by the takeaway roller 225 and the pre-registration roller 226, and the front surface is read by the first reading unit 23. The first reading unit 23 is an example of a first reading section in the present invention.

Inside a housing 24 where the platen glass PG2 having an upper surface on which the sheet S is placed is arranged, the first reading unit 23 is provided to be reciprocable in the sub-scanning direction (right-left direction: X-direction).

In a case of reading the sheet S pressed against the reading glass PG1, the first reading unit 23 is positioned at a home position (a position shown in FIG. 2).

In a case where the sheet S is placed on the platen glass PG2, the image of the entire sheet S is read by reading image information for each line while sequentially moving in the sub-scanning direction X.

As shown in FIG. 2, the first reading unit 23 is configured by light sources 231 and 232, a reflection mirror 233, mirrors 234 and 235, an image forming lens 236, and an image sensor 237 that has a light receiving element such as a charge coupled device (CCD).

The light sources 231 and 232 irradiate an irradiation region R2 of the sheet S with light from an obtuse angle, for example, a 45-degree direction with respect to an optical path C2 of reflected light, and a diffusely reflected image is obtained based on diffusely reflected light.

The sheet S which has passed through the reading glass PG1 is guided by a sheet guide SG and is transported to the third reading unit 27 that reads a back surface. The sheet S of which the front surface is read by the first reading unit 23 is transported in a sheet transport path G3 by a first discharge roller 229A while the back surface is being read by the third reading unit 27, and is discharged to a discharged paper tray 216 formed below the sheet stacked portion 21 by a second discharge roller 229B.

In a case where the sheet S such as a document of which an image is to be read is placed on the sheet stacked portion 21 and reading starts, the second reading unit 26 of the reading apparatus 2 in the sheet transport path G2 reads the front surface of the sheet S by turning on the light source 261 and generates image data indicating an image of specularly reflected light of the sheet S.

Next, the first reading unit 23 reads the front surface of the sheet S pressed against the reading glass PG1 by turning on the light sources 231 and 232 and generates image data indicating an image of diffusely reflected light.

As described above, in the present exemplary embodiment, the second reading unit 26 that reads, as a read image, specularly reflected light which is reflected from the sheet S from one side in the transport path while the sheet S is transported and the first reading unit 23 that reads, as a read image, diffusely reflected light which is reflected from the sheet S on the reading glass PG1 through which the moving sheet S passes are included, and the specularly reflected light and the diffusely reflected light from the sheet S can be obtained as read images with a single reading operation.

Then, for example, processing of obtaining one image, in which glossiness is reproduced, is performed using image data indicating the two generated images. Also the texture and roughness of an object to be imaged, which is displayed in an image by reproducing glossiness, is reproduced, and an image in which not only glossiness but also texture in a broad sense is reproduced is generated.

In addition, as shown in FIG. 2, the reading apparatus 2 is configured such that an optical path length from the sheet S to the image sensor 237 in a case where the first reading unit 23 reads diffusely reflected light is larger than an optical path length from the sheet S to the image sensor 263 in a case where the second reading unit 26 reads specularly reflected light. Accordingly, in a case where color information is included in the sheet S, which is a document, the color of the sheet S can be more appropriately understood, and the reading apparatus 2 can be miniaturized.

Modification Example 1

Figure 3:
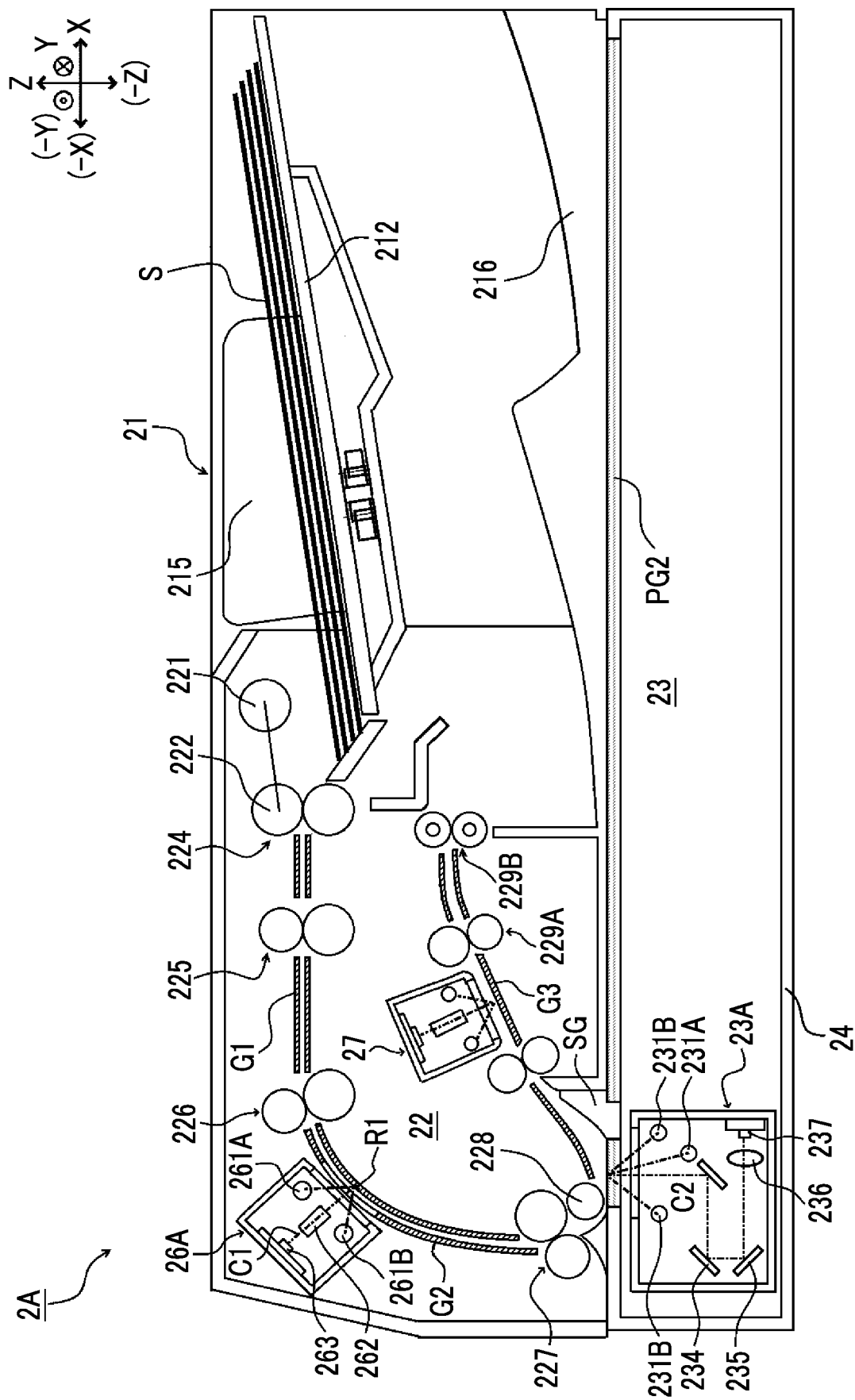
FIG. 3 is a cross-sectional configuration view showing an internal configuration of a reading apparatus according to Modification Example 1 of the first exemplary embodiment.

FIG. 3 is a cross-sectional configuration view showing an internal configuration of a reading apparatus 2A according to Modification Example 1.

As shown in FIG. 3, in the reading apparatus 2A, on the outer side of the sheet transport path G2, a second reading unit 26A that reads the front surface of the transported sheet S is arranged.

The second reading unit 26A is configured by light sources 261A and 261B that consist of a light emitting diode (LED), the image forming lens 262 that forms an image of reflected light from the sheet S at a predetermined magnification, and the image sensor (solid-state imaging element using CMOS) 263. The light sources 261A and 261B irradiate the irradiation region R1 of the sheet S with light from an obtuse angle, for example, the 45-degree direction with respect to the optical path C1 of the reflected light, and a diffusely reflected image is obtained based on diffusely reflected light.

A first reading unit 23A that reads the front surface of the sheet S, which is pressed against the reading glass PG1 and is transported, is configured by a first light source 231A, a second light source 231B, an image forming lens 232A that forms an image of reflected light from the sheet S at a predetermined magnification, and an image sensor (solid-state imaging element using CMOS) 233A.

The first light source 231A irradiates the irradiation region R2 of the sheet S with light at an acute angle with respect to the optical path C2 of the reflected light, for example, 8 degrees or less, and a specularly reflected image is obtained based on specularly reflected light.

The second light source 231B irradiates the irradiation region R2 of the sheet S with light from an obtuse angle, for example, the 45-degree direction with respect to the optical path C2 of the reflected light, and a diffusely reflected image is obtained based on diffusely reflected light.

In a case of reading the front surface of the sheet S which is pressed against the reading glass PG1 and is transported, the first reading unit 23A is positioned at the home position, the first light source 231A is turned on, and a specularly reflected image is obtained based on specularly reflected light which is reflected from the front surface of the sheet S.

In addition, in a case of reading the sheet S placed on the platen glass PG2, the image of the entire sheet S is read by reading image information for each line while turning on the second light source 231B and sequentially moving in the sub-scanning direction X.

The reading apparatus 2A according to Modification Example 1 includes the second reading unit 26A that reads, as a read image, diffusely reflected light which is reflected from the sheet S from one side in the transport path while the sheet S is transported and the first reading unit 23A that reads, as a read image, specularly reflected light which is reflected from the sheet S on the reading glass PG1 through which the moving sheet S passes, and the specularly reflected light and the diffusely reflected light can be obtained as read images with a single reading operation.

In this case, as the sheet S is pressed against the reading glass PG1 by the platen roller 228 in a state where a loop is held by the takeaway roller 225 and the pre-registration roller 226 and is read by the first reading unit 23A, the specularly reflected light from the sheet S can be stably obtained.

Modification Example 2

Figure 4:
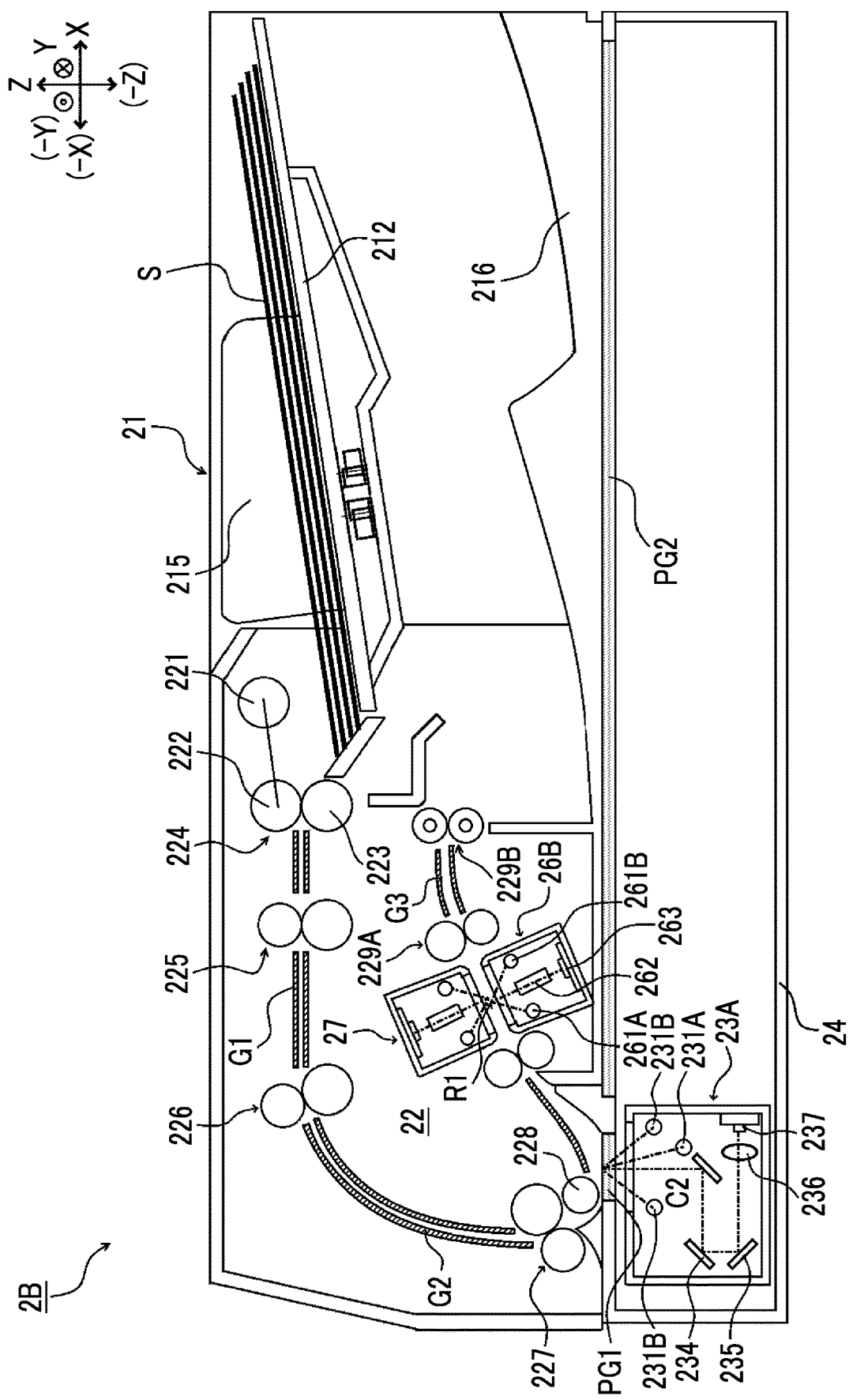
FIG. 4 is a cross-sectional configuration view showing an internal configuration of a reading apparatus according to Modification Example 2 of the first exemplary embodiment.

FIG. 4 is a cross-sectional configuration view showing an internal configuration of a reading apparatus 2B according to Modification Example 2.

As shown in FIG. 4, in the reading apparatus 2B, on an outer side of the sheet transport path G3, a second reading unit 26B that reads the front surface of the transported sheet S, from which specularly reflected light is read by the first reading unit 23A, is arranged.

The second reading unit 26B is configured by the light sources 261A and 261B that consist of a light emitting diode (LED), the image forming lens 262 that forms an image of reflected light from the sheet S at a predetermined magnification, and the image sensor (solid-state imaging element using CMOS) 263. The light sources 261A and 261B irradiate the irradiation region R1 of the sheet S with light from an obtuse angle, for example, the 45-degree direction with respect to the optical path C1 of the reflected light, and a diffusely reflected image is obtained based on diffusely reflected light.

The third reading unit 27 is arranged at a position facing the second reading unit 26B and reads the back surface of the sheet S of which the front surface is read by the first reading unit 23A.

That is, there is adopted a configuration where on the downstream side of the reading glass PG1 in a sheet transport direction, the second reading unit 26B, which is arranged such that the transported sheet S is sandwiched from the front and back, reads diffusely reflected light of the front surface of the sheet S and the third reading unit 27 simultaneously reads the back surface of the sheet S while the first reading unit 23A reads specular reflection from the front surface of the sheet S.

The configuration and action of the first reading unit 23A is the same as in the first reading unit 23A in Modification Example 1, and detailed description thereof will be omitted.

The reading apparatus 2B according to Modification Example 2 includes the first reading unit 23A that reads specularly reflected light which is reflected from the sheet S on the reading glass PG1 through which the moving sheet S passes and the second reading unit 26B that reads, on the downstream side of the reading glass PG1 in the sheet transport direction, diffusely reflected light which is reflected from the sheet S from one side in the transport path while transporting the sheet S from which specularly reflected light is read, and the specularly reflected light and the diffusely reflected light from the sheet S can be obtained as read images with a single reading operation.

Second Exemplary Embodiment

Figure 5:
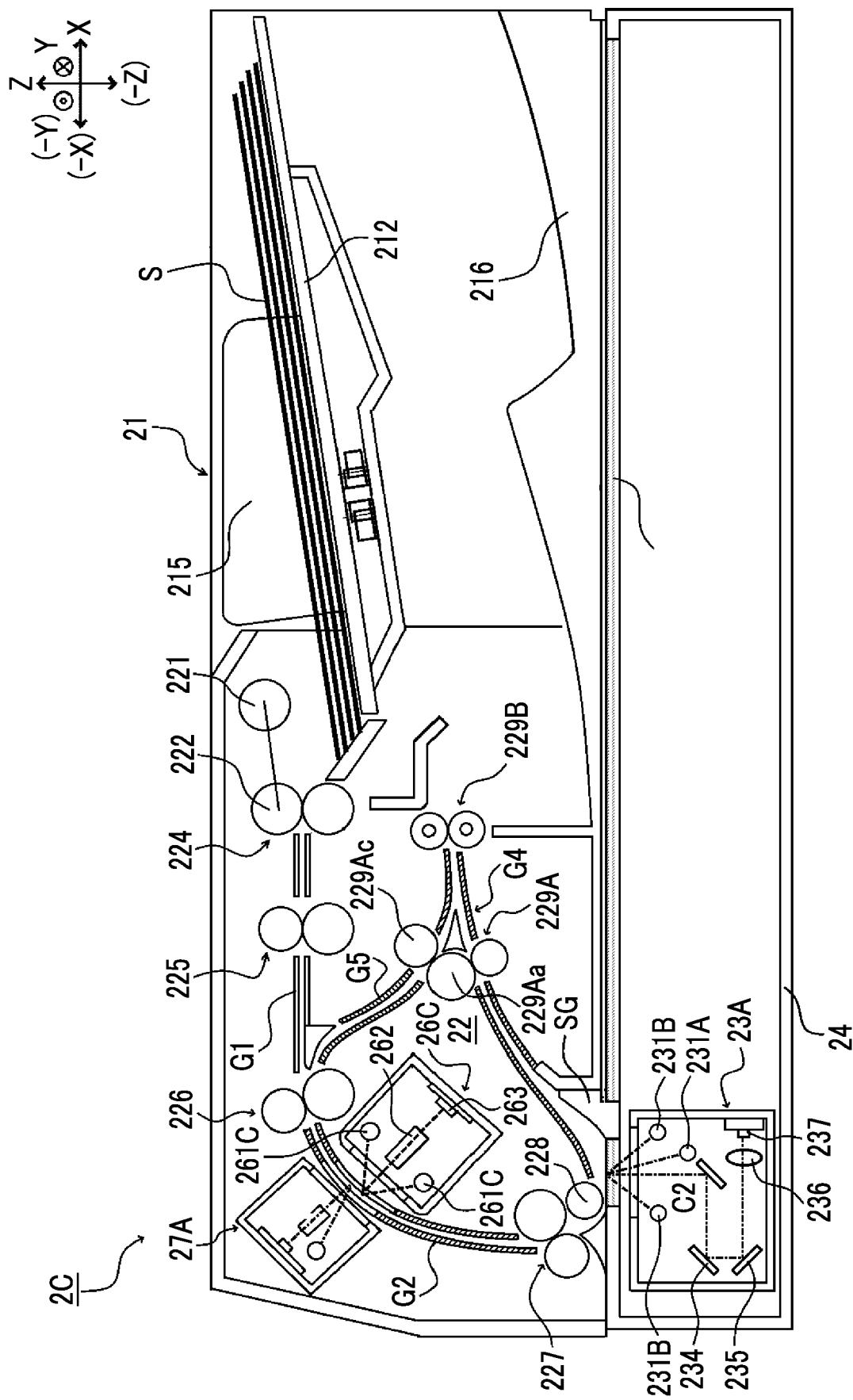
FIG. 5 is a cross-sectional configuration view showing an internal configuration of a reading apparatus according to a second exemplary embodiment.

FIG. 5 is a cross-sectional configuration view showing an internal configuration of a reading apparatus 2C according to a second exemplary embodiment.

The reading apparatus 2C according to the second exemplary embodiment includes an inversion transport path G4 in which the transported sheet S is inverted, the first reading unit 23A that reads, as read images, specularly reflected light and diffusely reflected light which are reflected from the sheet S on the upstream side in the sheet transport direction from the inversion transport path G4, and a second reading unit 26C that reads, as a read image, the diffusely reflected light reflected from the sheet S, and is controlled such that the first reading unit 23A reads the specularly reflected light reflected from the sheet S in a case where a first mode in which glossy image data indicating a glossy image of the sheet S is read is selected.

The reading apparatus 2C includes the inversion transport path G4 in which the sheet S is inverted and transported to the second reading unit 26C such that the back surface of the sheet S of which image information on the front surface is read by the first reading unit 23.

A switchback transport path G5 that connects the downstream side of the sheet transport path G3 to a position in the sheet transport path G2, at which the pre-registration roller 226 is arranged, is formed at the inversion transport path G4.

At a position on the upstream side of the switchback transport path G5 connected to the downstream side of the sheet transport path G3, an inversion driven roller 229Ac is pressure-welded to a drive roller 229Aa configuring the first discharge roller 229A, and a pair of inversion transport rollers are formed.

The sheet S of which image information on the front surface is read is transported in the switchback transport path G5 to a nip portion of the pre-registration roller 226 by the drive roller 229Aa and the inversion driven roller 229Ac such that the front surface is read again, passes through the sheet transport path G2, and is transported to the second reading unit 26C.

The second reading unit 26C is arranged on an inner side of the sheet transport path G2, which is curved such that the inner side is recessed, and reads the front surface of the inverted and transported sheet S.

Specifically, as shown in FIG. 5, the second reading unit 26C is configured by light sources 261C and 261C that consist of a light emitting diode (LED), the image forming lens 262 that forms an image of reflected light from the sheet S at a predetermined magnification, and the image sensor (solid-state imaging element using CMOS) 263. The light sources 261C and 261C irradiate the irradiation region R1 of the sheet S with light from an obtuse angle, for example, the 45-degree direction with respect to the optical path C1 of the reflected light, and a diffusely reflected image is obtained based on diffusely reflected light.

In addition, a third reading unit 27A that reads specularly reflected light reflected from the back surface of the sheet S, which is inverted and transported, is arranged on an outer side of the sheet transport path G2.

In the reading apparatus 2C configured as described above, it is possible to select the first mode in which an image formed on the sheet S, which is a document, is read as a glossy image via the operation information unit 4, which is a user interface, and a second mode in which the image is read as a normal image.

For example, in a case where the first mode, in which glossy image data in which the glossiness of the sheet S is reproduced is read, is selected, the first reading unit 23A is positioned at the home position, the first light source 231A is turned on, and a specularly reflected image is obtained based on specularly reflected light which is reflected from the front surface of the sheet S. Then, after being transported into the sheet transport path G3, the sheet S, on which the specularly reflected image on the front surface is read by the first reading unit 23A, is transported to the nip portion of the pre-registration roller 226 in the switchback transport path G5, and a diffusely reflected image is read by the second reading unit 26C from the front surface of the sheet S in a case of passing through the sheet transport path G2. In addition, the diffusely reflected image is simultaneously read by the third reading unit 27 from the back surface of the sheet S.

The sheet S on which the diffusely reflected image is read from the front surface of the sheet S by the second reading unit 26C is pressed against the reading glass PG1 by the platen roller 228 in a state where a loop is held by the pre-registration roller 226, the second light source 231B is turned on by the first reading unit 23A, and the normal image on the back surface is read.

Processing of obtaining one glossy image in which glossiness is reproduced using image data indicating the two images generated as described above can be performed, and the glossy image can be obtained on both sides of the sheet S.

In addition, in a case where the second mode, in which normal image data of the sheet S is read, is selected, the first reading unit 23A is positioned at the home position, the second light source 231B is turned on, and a diffusely reflected image is obtained based on diffusely reflected light which is reflected from the front surface of the sheet S. Then, after being transported into the sheet transport path G3, the sheet S, on which the diffusely reflected image on the front surface is read by the first reading unit 23A, is transported to the nip portion of the pre-registration roller 226 in the switchback transport path G5, and a diffusely reflected image on the back surface is read again on the reading glass PG1. Accordingly, a normal image can be obtained on both sides of the inverted and transported sheet S.

Modification Example

Figure 6:
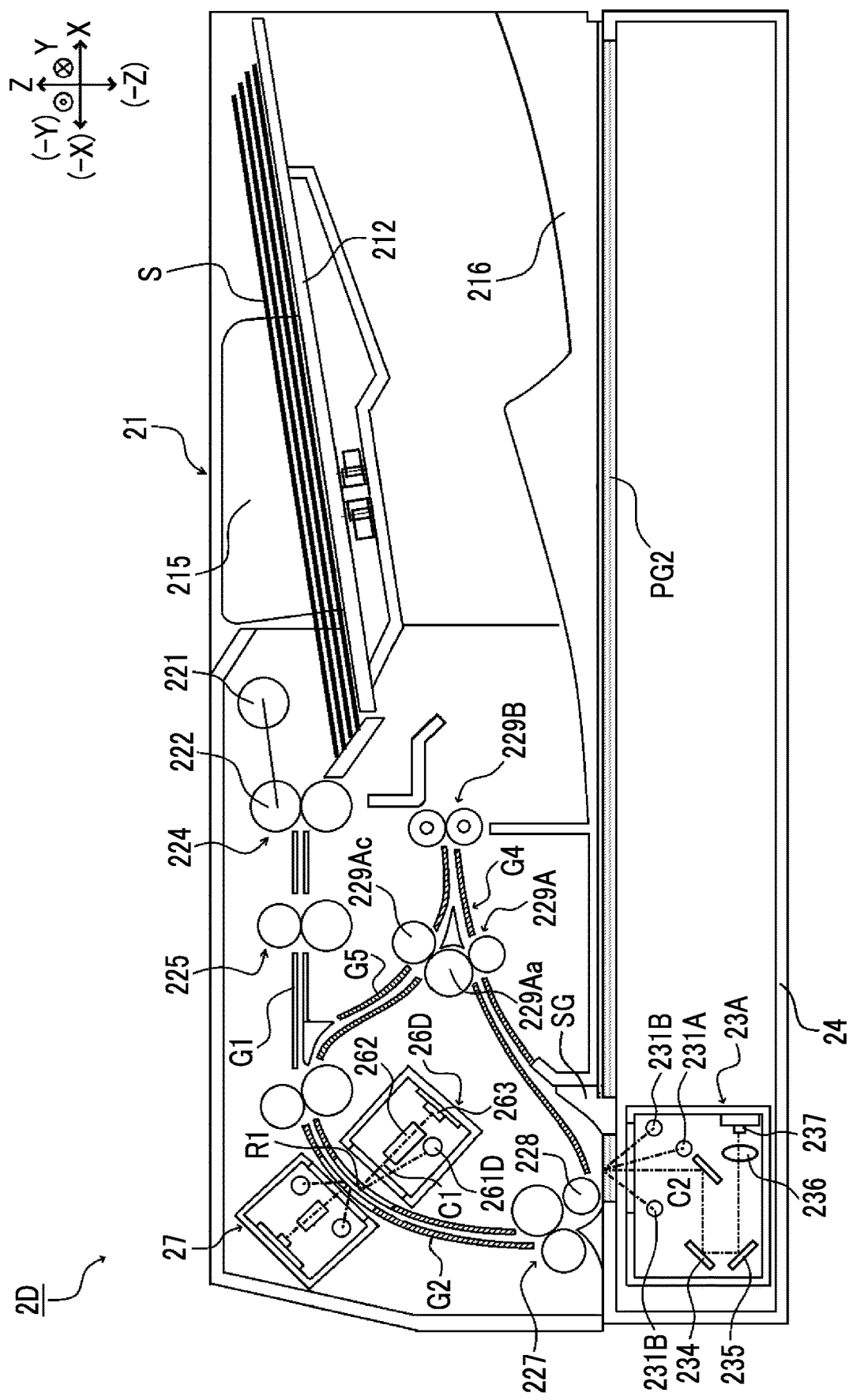
FIG. 6 is a cross-sectional configuration view showing an internal configuration of a reading apparatus according to Modification Example of the second exemplary embodiment.

FIG. 6 is a cross-sectional configuration view showing an internal configuration of a reading apparatus 2D according to Modification Example.

The reading apparatus 2D according to Modification Example includes the inversion transport path G4 in which the transported sheet S is inverted, the first reading unit 23A that reads, as read images, specularly reflected light and diffusely reflected light which are reflected from the sheet S on the upstream side in the sheet transport direction from the inversion transport path G4, and a second reading unit 26D that reads, as a read image, the specularly reflected light reflected from the sheet S.

The second reading unit 26D is arranged on the inner side of the sheet transport path G2, which is curved such that the inner side is recessed, and reads specularly reflected light from the front surface of the inverted and transported sheet S.

Specifically, as shown in FIG. 6, the second reading unit 26D is configured by a light source 261D that consists of a light emitting diode (LED), the image forming lens 262 that forms an image of reflected light from the sheet S at a predetermined magnification, and the image sensor (solid-state imaging element using CMOS) 263. The light source 261D irradiates the irradiation region R1 of the sheet S with light at an acute angle with respect to the optical path C1 of the reflected light, for example, 8 degrees or less, and a specularly reflected image is obtained based on the specularly reflected light.

As the second reading unit 26D that reads specularly reflected light is arranged on the inner side of the sheet transport path G2 curved to be recessed to the inner side, light which is emitted to the irradiation region R1 and is reflected is likely to be condensed, and tolerance with respect to an error of attaching the light source 261D can be increased, compared to a case where the curvature of a transport posture is low (for example, flat).

In the reading apparatus 2D according to Modification Example, the sheet S, on which the diffusely reflected image on the front surface is read by the first reading unit 23A, is transported to the nip portion of the pre-registration roller 226 in the switchback transport path G5 after being transported to the inversion transport path G4, and a specularly reflected image is read by the second reading unit 26D in a case of passing through the sheet transport path G2. In this case, since the second reading unit 26D that reads specularly reflected light is arranged on the inner side of the sheet transport path G2 which is curved such that the inner side is recessed, the specularly reflected light from the sheet S can be stably obtained.

In addition, the diffusely reflected image on the back surface of the sheet S is read by the third reading unit 27 in a case of passing through the sheet transport path G2. The sheet S on which the diffusely reflected image is read from the back surface of the sheet S by the third reading unit 27 is pressed against the reading glass PG1 by the platen roller 228 in a state where a loop is held by the pre-registration roller 226, the first light source 231A is turned on by the first reading unit 23A, and the specularly reflected image on the back surface is read.

Processing of obtaining one glossy image in which glossiness is reproduced using image data indicating the two images generated as described above can be performed, and the glossy image can be obtained on both sides of the sheet S.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading apparatus that reads an image formed on a document while transporting the document, the reading apparatus comprising:
a first reading section that reads, as a read image, one of specularly reflected light or diffusely reflected light which is reflected from the document on a reading glass through which the moving document passes; and
a second reading section that reads, as a read image, the other of the specularly reflected light or the diffusely reflected light which is reflected from the document on one side of a transport path through which the document is transported,
wherein the second reading section reads a document surface read by the first reading section.

2. The reading apparatus according to claim 1,
wherein the first reading section reads, as a read image, the specularly reflected light reflected from the document via the reading glass.

3. An output device that outputs a specular reflection degree based on specularly reflected light read by the reading apparatus according to claim 2.

4. An image forming apparatus comprising:
the output device according to claim 3,
wherein the image forming apparatus outputs an image formed based on a specular reflection degree read by the reading apparatus.

5. An output device that outputs a specular reflection degree based on specularly reflected light read by a reading apparatus, wherein the reading apparatus reads an image formed on a document while transporting the document, and the reading apparatus comprises:
a first reading section that reads, as a read image, one of specularly reflected light or diffusely reflected light which is reflected from the document on a reading glass through which the moving document passes; and a second reading section that reads, as a read image, the other of the specularly reflected light or the diffusely reflected light which is reflected from the document on one side of a transport path through which the document is transported.

6. An image forming apparatus comprising:

the output device according to claim 5, wherein the image forming apparatus outputs an image formed based on a specular reflection degree read by the reading apparatus.

* * * * *